Figure 1:
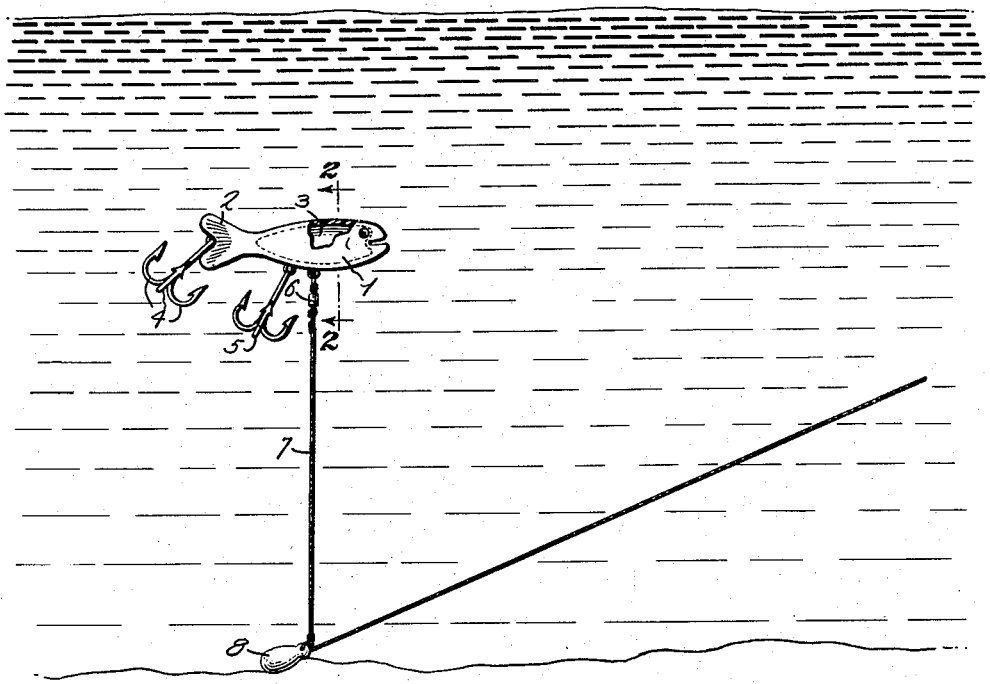

April 14, 1959    J. O. BRYAN    2,881,549
FISH LURE
Filed June 17, 1952

INVENTOR
J. O. Bryan

BY Mason, Fenwick & Lawrence
ATTORNEYS

2,881,549
FISH LURE
Jim O. Bryan, Largo, Fla.

Application June 17, 1952, Serial No. 293,976

2 Claims. (Cl. 43—43.15)

The present invention relates to fish lures, and particularly to fish lures of the buoyant type.

Fish lures of many types have been devised, and many of them are of the buoyant, or floating, type. Due to the fact that the lures of known types have the line attached at or near the nose of the body, the lure assumes an upward angle when drawn through the water. A number of devices have been used to attempt to cure this defect, among which are the well-known, downwardly inclined plane at the head, projecting bills, etc. These have had the effect of causing the lure to assume a downwardly inclined position, or to plunge or dive when drawn through the water. None of the types mentioned will move through the water in a horizontal position. Thus, they lose their efficacy by appearing artificial. Only a life-like movement will attract fish.

The object of the present invention is to provide a fish lure which will move through the water on a plane above the bottom, and remain horizontal during movement, or when allowed to remain stationary.

Another object of the invention is to provide a lure of this type which will not yaw or turn sideways across a moving current of water.

A further object is the provision of a lure which is life-like in its movement through the water to readily attract fish.

A still further object of the invention is to provide such a lure which may be caused to maintain any predetermined height above the bottom of the water, or to float upon the surface, if desired.

Other objects of the invention will appear from the following description of one practical embodiment thereof when taken in conjunction with the drawings which accompany and form a part of this specification.

Figure 2:
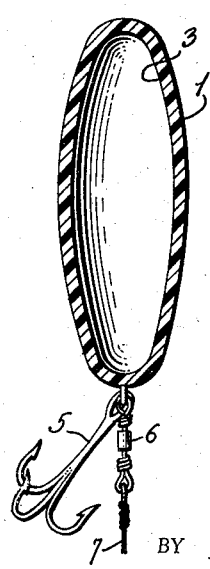

In the drawings:

Figure 1 is a side view of the line with its weight, or sinker, attached to a fishing line, showing the position of the lure in the water; and Figure 2 is a vertical section through the body of the lure at the point of line attachment, and is taken on the line 2—2 of Figure 1.

Refering to the drawings in detail, the invention resides primarily in a particular location for the center of buoyancy of the body of the lure, and the point for attaching the fishing line.

The lure may be formed in any desired configuration, and of any desired and suitable material. It is shown in the drawing to represent a minnow, or other small fish. It has a hollow body 1 and a tail 2. The chamber 3 within the body will contain air and make the lure buoyant so that it will tend to rise to the surface when thrown into the water. Gang hooks 4 and 5 may be attached to the tail and underside of the body to the rear of the center of the body.

Contrary to custom, the swivel 6 for connecting the line is attached to the bottom of the lure at a point slightly forward of the center of the lure. The point of attachment is exactly at the center of buoyancy, or point of balance, of the lure. The line 7 runs from the swivel to the customary reel. Between the lure and reel, a conventional sinker 8 is attached to the line. The sinker is attached to the line at a distance from the lure equal to the distance above the bottom of the water at which it is desired for the lure to float. The level at which the lure will float may be varied at will by shifting the position of the sinker on the line.

When the lure is thrown into the water, it will tend to rise to the surface, but due to the fact that the sinker will fall to the botom, the sinker will act as an anchor to hold the lure in position. The lure will be directly over the sinker when in the water. Because the line is attached just at the center of buoyancy of the lure, the lure will assume a substantially horizontal position. The buoyancy of the lure being equal on both sides of the point of attachment will maintain the lure in horizontal-position. As the line is drawn in, or jerked forward, the sinker will be caused to move along the bottom and move the lure. The buoyancy of the lure will keep it above the sinker at all times. Because of this, the movement of the lure will always be horizontal.

The center of buoyancy of the lure is purposely located forwardly of the center. Thus, the longer portion of the lure extends to the rear of the point of line attachment. When drawn through the water, the longer tail portion serves as a rudder to hold the nose of the lure in the direction of travel. This adds to the life-like appearance in the water.

It will be understood that any of the known devices to give life-like movement to the lure may be attached to the body. Whenever any additional device is attached, due regard must be had to its placement so that the center of buoyancy will always be at the point of line attachment.

While one practical embodiment of the invention has been disclosed, it will be understood that the specific details described and shown are merely by way of illustrating and the invention may take other forms within the scope of the appended claims.

What is claimed is:

1. In a fish lure, an elongated body buoyant in water, hooks attached to said body to the rear of the longitudinal center of the body, said body and hook assemblage having its center of buoyancy forward of the longitudinal center of the body, means to which a line may be attached connected to the underside of said body directly beneath said center of buoyancy, a line fastened to said attaching means, and a weight fixed to said line a predetermined distance from said body.

2. In a fish lure, an elongated body buoyant in water, hooks attached to said body to the rear of the longitudinal center of the body, said body and hook assemblage having its center of buoyancy forward of the longitudinal center of the body, and means to which a line may be attached connected to the underside of said body directly beneath said center of buoyancy.

References Cited in the file of this patent

UNITED STATES PATENTS

| | | |
|---|---|---|
| 841,429 | Passage | Jan. 15, 1907 |
| 891,037 | Caldwell | June 16, 1908 |
| 1,338,953 | Odell | May 4, 1920 |
| 1,589,522 | Felix | June 22, 1926 |
| 1,961,539 | White | June 5, 1934 |
| 1,991,253 | Kerns | Feb. 12, 1935 |
| 2,097,986 | McEwen | Nov. 2, 1937 |
| 2,159,606 | Scogland et al. | May 23, 1939 |
| 2,289,663 | Linhares | July 14, 1942 |